United States Patent [19]
Henkes

[11] Patent Number: 4,992,916
[45] Date of Patent: Feb. 12, 1991

[54] PRISMATIC ILLUMINATOR FOR FLAT PANEL DISPLAY

[75] Inventor: John L. Henkes, Latham, N.Y.

[73] Assignee: General Electric Company, Schenectady, N.Y.

[21] Appl. No.: 363,645

[22] Filed: Jun. 8, 1989

[51] Int. Cl.[5] .............................................. F21V 5/02
[52] U.S. Cl. .................... 362/255; 362/125; 362/216; 362/223; 362/339; 362/300; 362/307; 362/311
[58] Field of Search ............... 362/125, 216, 217, 223, 362/224, 225, 255, 300, 307, 311, 339, 256

[56] References Cited

U.S. PATENT DOCUMENTS

| | | | |
|---|---|---|---|
| 3,761,704 | 9/1973 | Takeichi et al. | 362/339 |
| 4,342,071 | 7/1982 | Chamberlain | 362/307 |
| 4,404,619 | 9/1983 | Ferguson | 362/311 |
| 4,425,604 | 1/1984 | Imai et al. | 362/307 |
| 4,562,517 | 12/1985 | Pankin | 362/217 |
| 4,641,226 | 2/1987 | Kratz | 362/307 |

*Primary Examiner*—Ira S. Lazarus
*Assistant Examiner*—Sue Hagerman
*Attorney, Agent, or Firm*—Marvin Snyder; James C. Davis, Jr.

[57] ABSTRACT

An illuminator for a flat panel display utilizes at least one light source and at least one prism having total-internally-reflection at all but its front surface. Multiple images of the source(s) are provided over the front prism surface. A reflective coating can be used on at least one of the illuminator prism surfaces, so as to increase the total portion of the light from each source directed from an illuminator surface toward the display. The sources may be located within the prisms, or may be arranged colinearly with the elongated axis of each prism.

20 Claims, 4 Drawing Sheets

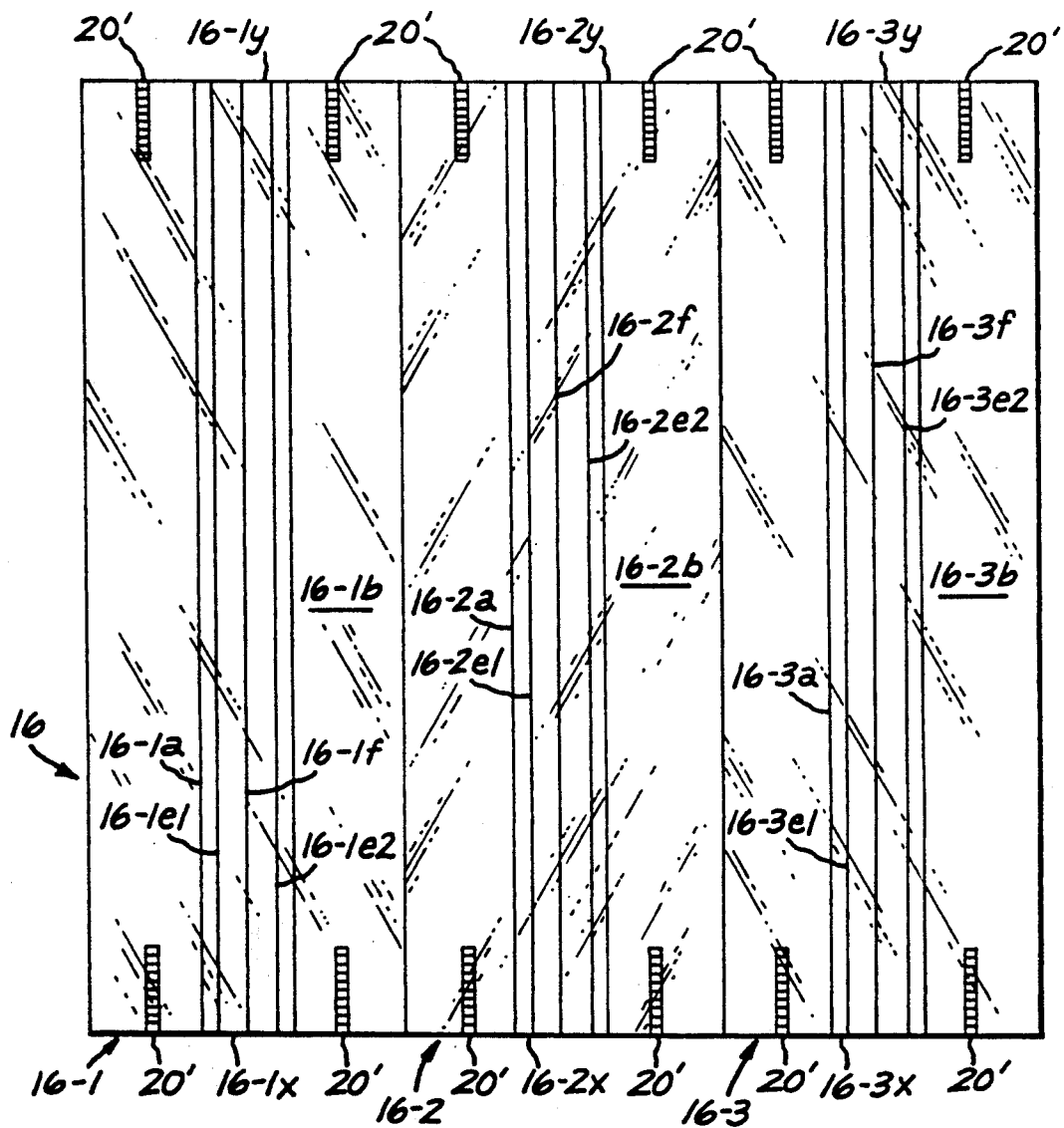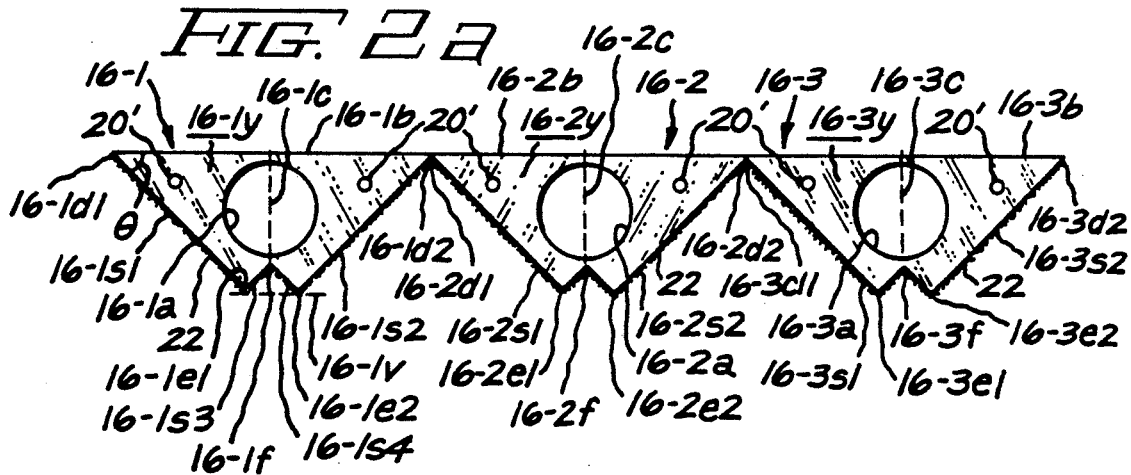

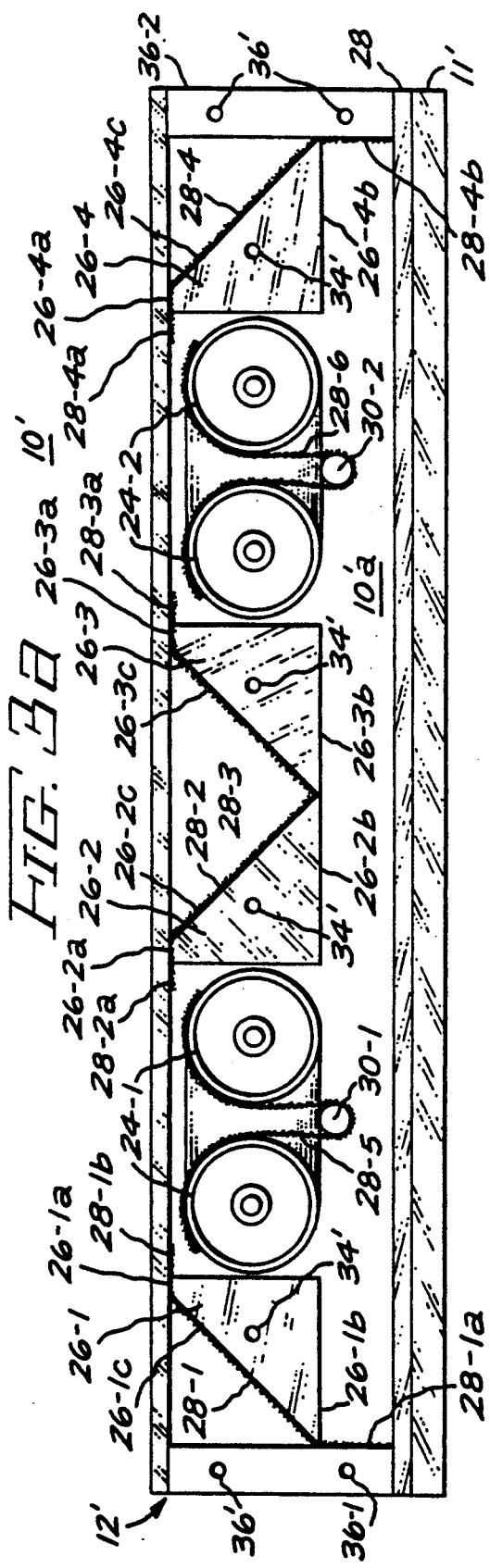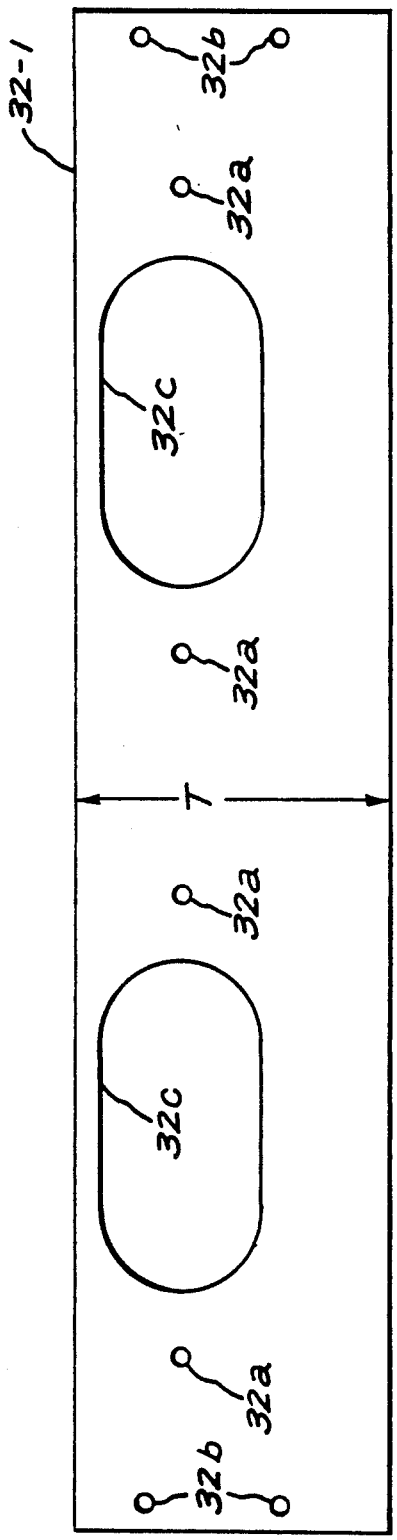

PRISMATIC ILLUMINATOR FOR FLAT PANEL DISPLAY

BACKGROUND OF THE INVENTION

The present invention relates to flat panel displays, such as liquid crystal displays and the like, and, more particularly, to a novel prismatic device for efficiently and uniformly illuminating a transmissive flat panel display.

It is well known that, in order to efficiently back-light a transmissive flat panel display, such as a liquid crystal display and the like, a planar radiator is required at the rear of that display. Typically, the light source is a fluorescent lamp which is usually placed in a reflective cavity, where the cavity size must be relatively large to allow the light from the source to be sufficiently integrated to substantially uniformly illuminate the rear surface of the flat panel display. Generally, these cavities are very much larger and thicker than is desirable for illuminating the relatively thin displays. It is therefore highly desirable to reduce the overall size of an illuminator utilized for uniformly and efficiently illuminating a flat panel display, such as a liquid crystal display and the like.

BRIEF SUMMARY OF THE INVENTION

In accordance with the present invention, an illuminator for a flat panel display, such as a liquid crystal display and the like, utilizes at least one light source and at least one prism having total-internally-reflection at all but its front surface. Multiple images of the source(s) are provided over the front prism surface. A reflective coating can be used on at least one of the illuminator prism surfaces, so as to increase the total portion of the light from each source directed from an illuminator surface toward the display. When used with a liquid crystal display and the like, wherein very uniform illumination is desired over the entire display, a diffusion member, formed of opal glass and the like, may be used; the diffuser may be spaced in front of the illuminator surface, to provide an optical cavity of selected extent. The sources may be located within the prisms, or may be arranged colinearly with the elongated axis of each prism.

In presently preferred embodiments, the light source is at least one fluorescent lamp, of either an elongated or U-shaped form, contained within a single or multiple-piece, multi-faceted prism having a selected highly-reflective coating on selected surfaces thereof.

Accordingly, it is an object of the present invention to provide novel prismatic illuminators for flat panel displays.

This and other objects of the present invention will become apparent upon reading of the following detailed description, when considered in conjunction of the associated drawings.

BRIEF DESCRIPTION OF THE DRAWINGS

FIGS. 2 and 2a are respective front and bottom views of the multifaceted prism utilized in the first embodiment of FIG. 1;

FIG. 3a is a top view looking into the prismatic illuminator of FIG. 3, and useful in appreciating the relationship of the various elements thereof; and FIG. 3b is a plan view of an end member useful in fabricating the prismatic illuminator of FIG. 3.

DETAILED DESCRIPTION OF PRESENTLY PREFERRED EMBODIMENTS OF THE INVENTION

Figure 1:
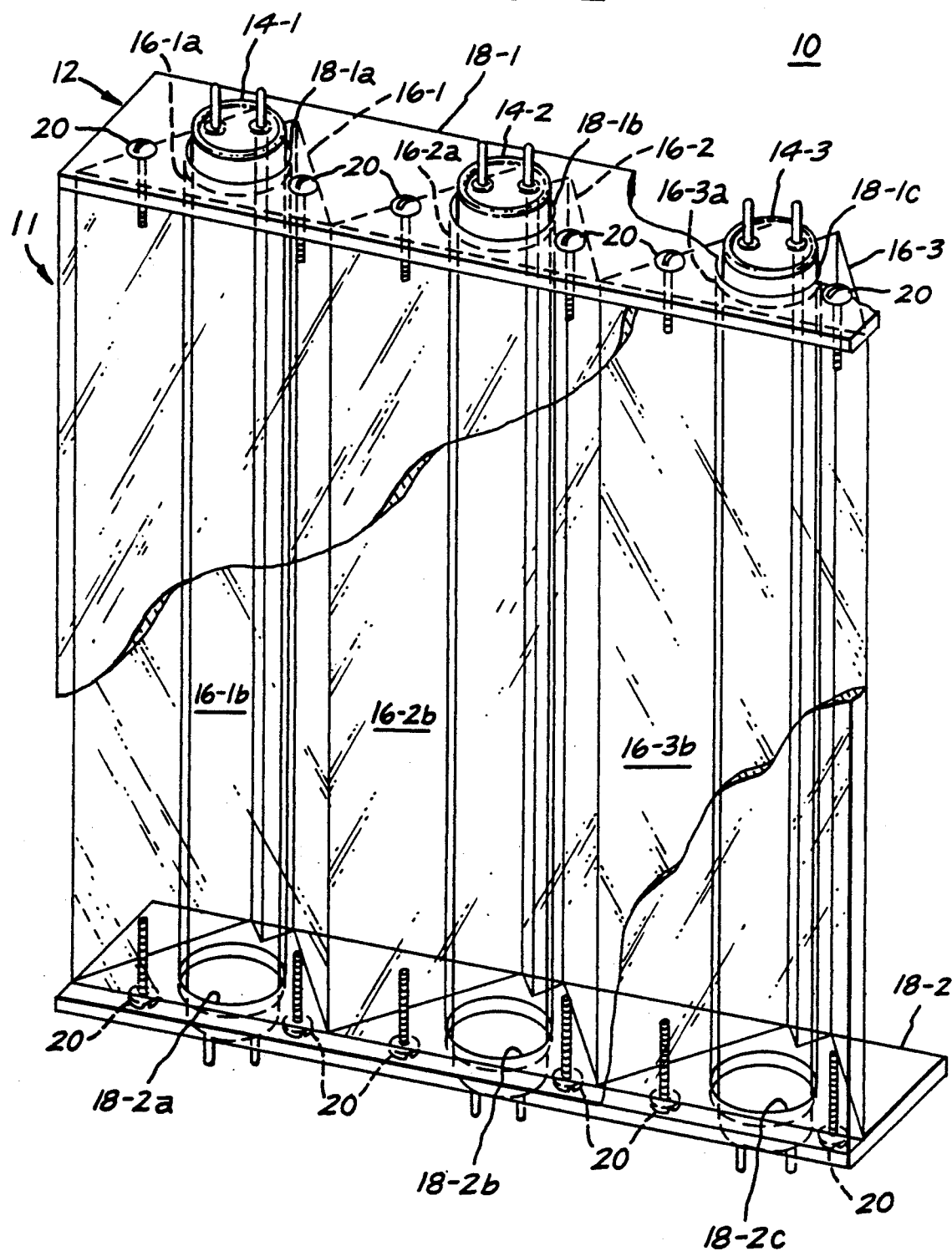
FIG. 1 is a partially-sectionalized oblique view of a first prismatic illuminator, and of a flat panel display with which it is used.

Referring initially to FIGS. 1, 2 and 2a, a display system 10 utilizes a flat panel display 11, such as a flat liquid crystal display (LCD) and the like, of transmissive form and receiving substantially uniform illumination from a first embodiment 12 of a prismatic illuminator in accordance with the principles of the present invention. Illuminator 12 utilizes at least one light source 14, each contained within an aperture 16a of an associated prism member 16; a front face 16b of each prism is juxtaposingly aligned with all other prism front faces, to provide a substantially planar surface from which the illumination is transmitted to display 11. A plurality n of elongated fluorescent lamp light sources (here, n=3 sources 14-1, 14-2 and 14-3) are utilized, with the lamps being placed with their axes substantially parallel to one another and to the illuminator front faces 16b. A like plurality n of prism members 16 are used. Accordingly, there are n=3 prism members 16-1, 16-2, 16-3, each elongated in the direction of the associated one of lamps 14-1, 14-2, or 14-3, with the lamp being placed within an axially-extended aperture 16-1a, 16-2a or 16-3a of the prism, and located parallel to the co-planar prism front faces 16-1b, 16-2b and 6-3b, respectively. The prism member bottom surfaces 16-1x, 16-2x and 16-3x are substantially coplanar to one another, substantially perpendicular to the front prism faces, and substantially parallel to the coplanar prism top surfaces 16-1y, 16-2y and 16-3y, which are also substantially perpendicular to the prism front faces. Top and bottom end members 18-1 and 18-2, respectively, are fastened with suitable fastening means 20 to suitable formations 20′ in the prism top and bottom surfaces; it should be understood that the prism top and bottom surfaces, and therefore the planes of the fastening members 18, need not be substantially perpendicular to the prism front faces 16-ib, where 1≦i≦n, and n is the number of sources/prisms, being 3 in the present example), although such substantially-perpendicular disposition may be quite useful in the retention of the adjacent display 11, and other parts of the structure. It will be seen that each of the substantially-rectangular flat top and bottom members 18 has a set of apertures, e.g. apertures 18-1a, 18-1b and 18-1c, closely passing the associated end of an associated lamp 14 therethrough, for lamp retention purposes. Additional lamp-retention means, such as resilient glue, rubber grommets and the like, can also be utilized.

Each prism member 16 (as best seen in the front view of FIG. 2 and the top view of FIG. 2a) is formed of a substantially transparent material, such as a plastic and the like. The cross-sectional shape of each of the illustrated prism members 16-i is that of an isosceles triangle with corner angle θ (here, θ≈45°) and with the rear corner, opposite front face 16-ib, being inverted, about an inversion line 16i, so that the cross section is substantially W-shaped and symmetric about a prism member centerline 16-ic, orthogonal to each prism member front face 16-ib and substantially equally spaced from that prism member's opposite front corners 16-id1 and 16-id2. Each pair of prism side surfaces 16-is1 and 16-is2 converge towards the prism member centerline 16-ic but do not meet, terminating instead at a pair of substantially right-angle corner 16-ie1 and 16-ie2, equally spaced from both the prism member front surface 16-ib and centerline 16-ic. The prism member then has a pair of substantially-symmetrically-disposed minor side surfaces 16-is3 and 16-is4 (see the left-hand-most prism 16-1 of FIG. 2a), which converge towards the prism centerline 16-ic forward of inversion line 16iv to meet at an inversion corner 16-if, which is typically a 90° corner, located upon the prism member centerline 16-ic. Thus, each prism member 16-i is formed with four facets (faces 16-is1 through 16-is4), of angles selected so that, when coupled with the selection of the prism member material, cause total internal reflection of light incident upon those four prism surfaces. Thus, light from each lamp 14-i is reflected from the surfaces of the associated prism member 16-i to exit at single front surface 16-ib, which acts as a plane radiator. When the co-planar prism front surfaces 16-ib are viewed, this surface appears to contain and be filled with multiple images of the different portions of the surfaces of lamps 14. These images occur, and will be seen, due to the prism facet surfaces acting as mirrors and each reflecting a different portion of the lamp surface. Additional lamp light, not totally-internally-reflected at the surfaces, can be provided, after at least one reflection, by providing a coating 22 of the prism surfaces 16-is1 through 16-is4 with a suitable material. Such a material might be fumed magnesium oxide, although I find that a more convenient coating is the reflecting material sold by Eastman Kodak as their coating material No. 6080. Utilization of such extremely high reflectivity coatings will not signifcantly interfere with the total-internal-reflection at the prism member surfaces, but will reflect any non-internally-reflected light.

Figure 3:
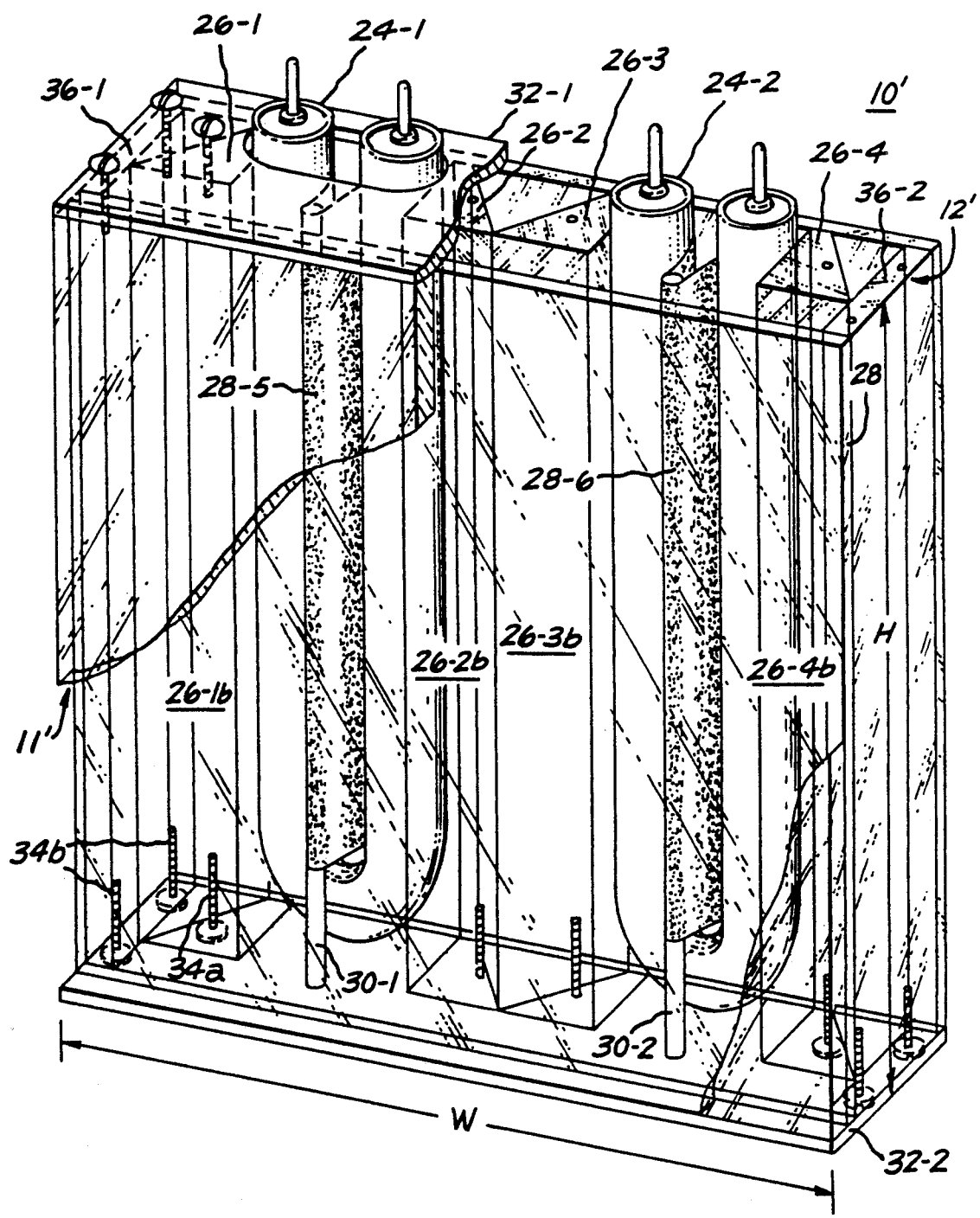
FIG. 3 is a partially-sectionalized oblique view of another prismatic illuminator, in accordance with the principles of the present invention.

Referring now to FIG. 3, 3a and 3b, a second form of my novel prismatic illuminator 10' is shown, which removes the light sources images, so that a transparent liquid crystal display 11', and the like, can be illuminated with a more diffuse light. Here, the light from at least one U-shaped light sources 24 (and specifically a pair of U-shaped fluorescent lamps 24-1 and 24-2), is directed, partially directly and partially via reflection in associated prism members 26-i (here, members 26-1 through 26-4), through a diffusing member 28, forming the forward surface of an optical cavity 10'a of the illuminator. Advantageously, the diffusing member 28 is formed of a material, such as opal glass and the like, which will have very little light absorption. Here, the prismatic structure associated with each light source 24 has a plurality (e.g. 2) of prism members 26. Each prism member has a substantially triangular cross-section, with the rearward corner 26-ia being removed along a surface substantially parallel to the prism front surface 26ib, to aid in reflection of source light in the desired direction. A reflective coating 28-i is used upon the diagonal surface 26-ic and corner 26-ia of each prism, with extensions 28-1a/28-1b, 28-2a, 28-3a and 28-4a/28-4b therefrom so positioned as to reflect additional light not initially directed from one of sources 24 toward the display 11' to be illuminated. Additional reflector sheets 28-5 and 28-6 are provided between the arms of the U-shaped lamps, and are positioned by rods 30-1 and 30-2, extending from top member 32-1 to bottom member 32-2. Each of members 32, in additional to apertures 32a for passing fastening means 34a engaging formation 34' in prisms 26, has other apertures for passing other fastening means 34b engaging formations 36' in one of a pair of side support members 36; side members 36-1 and 36-2 increase the structural integrity of illuminator 12' and help maintain diffuser 28 and/or display 11' at the proper distance and location with respect to the light sources and/or prisms. The top end member 32-1 also has an aperture 32c for closely passing the ends of one of the light sources; because of the presence of rods 30 and reflectors 28-5 and 218-6, it is contemplated that both end members 32 will be removed to facilitate replacement of the light source lamps 24. A typical unit may be 4" high (H) by 4" wide (W), with a 1" thickness (T); 60% of the lumen output of a pair of 4 watt fluorescent lamps 24 is uniformly transferred to the display 11.

While several presently preferred embodiments of our novel invention is described in detail herein, many modifications and variations will now become apparent to those skilled in the art. It is our intent, therefore, to be limited only by the scope of the appending claims, and not by the particular details and instrumentalities presented by way of explanation of the embodiments, described herein.

What I claim is:

1. An illuminator for substantially uniformly illuminating a flat panel display, comprising:
    at least one light source, each having at least one elongated light producing region, the light-producing region of any source being positioned parallel to the light-producing region of any other source if more than one light source is present; and
    at least one elongated prism member, each having a front surface and at least one other surface not parallel to the front surface, each member being located with its elongated dimension at a fixed relationship to a selected elongated light-producing region of an associated source and exhibiting substantially total-internal-reflection of light incident upon any surface, other than said front surface, from within the prism member, to provide multiple images of the associated light source from said front surface.

2. The illuminator of claim 1, further comprising a reflective coating on at least one non-front surface of at least one prism member.

3. The illuminator of claim 2, wherein the reflective coating is fumed magnesium oxide.

4. The illuminator of claim 2, wherein said reflective coating is present on all non-front prism member surfaces.

5. The illuminator of claim 4, wherein the reflective coating is fumed magnesium oxide.

6. The illuminator of claim 1, further comprising means for retaining each light source in fixed relationship to the associated prism member.

7. The illuminator of claim 6, wherein said retaining means includes at least one end member, affixable to said at least one prism member, having an aperture for closely receiving and retaining an associated light source.

8. The illuminator of claim 1, wherein each said light source is a fluorescent lamp.

9. The illuminator of claim 8, wherein each said lamp is U-shaped and has a plurality of light-producing regions.

10. The illuminator of claim 1, further comprising means for diffusing the light emitted from the front surface of each prism member and toward a location at which said display is to be located.

11. The illuminator of claim 1, wherein a single prism member substantially surrounds each associated light source.

12. The illuminator of claim 11, wherein each prism member has a generally W-shaped modified-triangular cross-section in a plane perpendicular to the elongated direction thereof, and has an aperture formed therethrough, along a centerline thereof, for receiving the associated light source.

13. The illuminator of claim 12, wherein a rear corner of the prism member is inverted about an inversion line substantially parallel to the prism member front surface.

14. The illuminator of claim 13, wherein the distance between a pair of resulting rear prism corners is less than the light-source aperture diameter.

15. The illuminator of claim 12, wherein each of the angles formed between the prism member front surface and the pair of major side surfaces is about 45°.

16. The illuminator of claim 1, wherein a plurality of prism members are arranged around each associated light source.

17. The illuminator of claim 16, wherein an even number of prism members are substantially symmetrically arranged about each light source.

18. The illuminator of claim 17, wherein each prism member has a generally triangular cross-section) in a plane perpendicular to the elongated direction thereof.

19. The illuminator of claim 18, wherein a rearward corner of each prism member is removed, along a line generally parallel to the prism member front surface.

20. The illuminator of claim 17, further comprising means for reflecting source light, not directed toward one of said prism members or toward a location at which said display can be located, toward a prism member.

* * * * *